(12) United States Patent  (10) Patent No.: US 7,775,599 B2
George et al.  (45) Date of Patent: Aug. 17, 2010

(54) VEHICLE SEAT ASSEMBLY WITH FORE-AFT ADJUSTABLE BACK PORTION

(75) Inventors: Gegi George, Farmington Hills, MI (US); Kyle Calvert, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 137 days.

(21) Appl. No.: 12/048,548

(22) Filed: Mar. 14, 2008

(65) Prior Publication Data

US 2009/0230748 A1   Sep. 17, 2009

(51) Int. Cl.
B60N 2/02   (2006.01)

(52) U.S. Cl. .......................... 297/383; 297/101; 297/94

(58) Field of Classification Search ................ 297/101, 297/103, 383, 283.3, 94, 95
See application file for complete search history.

(56) References Cited

U.S. PATENT DOCUMENTS

| | | | | |
|---|---|---|---|---|
| 615,227 | A * | 11/1898 | Pickles | 297/101 |
| 3,265,435 | A * | 8/1966 | Bilancia | 297/101 |
| 4,040,660 | A | 8/1977 | Barecki | |
| 4,133,578 | A | 1/1979 | Fancy | |
| 4,368,916 | A * | 1/1983 | Blasin | 297/341 |
| 4,655,503 | A * | 4/1987 | Kamijo et al. | 297/238 |
| 4,685,735 | A | 8/1987 | McFalls et al. | |
| 4,840,427 | A * | 6/1989 | Hong | 297/344.14 |
| 5,362,124 | A * | 11/1994 | Schlidt | 297/95 |
| 5,775,776 | A * | 7/1998 | Schooler et al. | 297/375 |
| 5,902,013 | A * | 5/1999 | Hong | 297/383 |
| 6,488,333 | B2 * | 12/2002 | Kim | 297/94 |
| 6,695,378 | B2 * | 2/2004 | Hanagan | 296/65.01 |
| 6,715,825 | B2 * | 4/2004 | Tame | 297/94 |
| 7,222,920 | B1 * | 5/2007 | Washington | 297/383 |
| 7,234,768 | B2 * | 6/2007 | Manning | 297/94 |
| 7,252,337 | B2 | 8/2007 | Hofmann et al. | |
| 2003/0047974 | A1 * | 3/2003 | Tame | 297/283.3 |
| 2004/0245830 | A1 | 12/2004 | Scheck et al. | |
| 2005/0062326 | A1 * | 3/2005 | Kim et al. | 297/344.1 |
| 2005/0264075 | A1 | 12/2005 | Hofmann et al. | |
| 2007/0170763 | A1 | 7/2007 | Beneker et al. | |
| 2008/0290700 | A1 * | 11/2008 | Paluch | 297/95 |

* cited by examiner

*Primary Examiner*—Sarah B McPartlin
(74) *Attorney, Agent, or Firm*—Brooks Kushman P.C.

(57) ABSTRACT

The vehicle seat assembly having a seat bottom portion that is adapted to be attached to a vehicle. The seat bottom portion has a longitudinal axis. The seat back is disposed proximate the seat bottom portion. A linkage connects the seat back to the seat bottom portion. The linkage is configured to move substantially the entire seat back along the longitudinal axis of the seat bottom portion between a first position and a second position.

15 Claims, 4 Drawing Sheets

VEHICLE SEAT ASSEMBLY WITH FORE-AFT ADJUSTABLE BACK PORTION

BACKGROUND OF THE INVENTION

1. Field of the Invention

The invention disclosed herein relates to vehicle seat assemblies having seat back portions that are fore-aft adjustable.

2. Background Art

A vehicle seat assembly having a fore-aft adjustable back portion is disclosed herein. Vehicle seat assemblies are disclosed in U.S. Pat. Nos. 4,685,735; 4,133,578; and 4,040,660 and in U.S. Publication Nos. 2007/0170763; and 2004/0245830.

SUMMARY OF THE INVENTION

A vehicle seat assembly having a fore-aft adjustable back portion is disclosed herein. In a first embodiment, the vehicle seat assembly comprises a seat bottom portion that is adapted to be attached to a vehicle. The seat bottom portion has a longitudinal axis. A seat back portion is disposed proximate the seat bottom portion. A linkage connects the seat back portion to the seat bottom portion. The linkage is configured to move substantially the entire seat back portion along the longitudinal axis of the seat bottom portion between a first position and a second position.

In an implementation of the first embodiment, an angular orientation between the seat back portion and the seat bottom portion when the seat back portion is in the first position is substantially the same as the angular orientation between the seat back portion and the seat bottom portion when the seat back portion is in the second position.

In another implementation, the linkage comprises a four bar linkage. In a variation of this implementation, the four bar linkage comprises a first member having a first end and a second end, a second member having a first end and a second end, the seat back portion and the seat bottom portion. The first member and the second member are pivotally connected at their respective first ends to the seat back portion. The first member and the second member are pivotally connected at their respective second ends to the seat bottom portion. The first member and the second member are spaced apart along the longitudinal axis of the seat bottom portion.

In another implementation of the first embodiment, the linkage is a first linkage. The vehicle seat assembly further comprises a second linkage connecting the seat back portion to the seat bottom portion. The second linkage is configured to cooperate with the first linkage to move the seat back portion from the first position to the second position. In a variation of this implementation, the first linkage is disposed proximate an outboard portion of the seat bottom portion and an outboard portion of the seat back portion. The second linkage is disposed proximate an inboard portion of the seat bottom portion and an inboard portion of the seat back portion. In some variations, the vehicle seat assembly may further include a twist resilient stabilizing member connecting the first linkage to the second linkage. The stabilizing member is configured to facilitate generally simultaneous operation of the first and the second linkage. In some variations, the stabilizing member is generally cylindrical and made from a material comprising metal.

In another implementation of the first embodiment, the vehicle seat assembly further comprises a latch subassembly connected to the seat back portion. The latch subassembly is configured to secure the seat back portion in the first position when the seat back portion is disposed in the first position. The latch subassembly is further configured to secure the seat back portion in the second position when the seat back portion is disposed in the second position. In a variation of this implementation, the vehicle has a first striker wire and a second striker wire. The latch subassembly is configured to engage with the first striker wire when the seat back portion is in the first position. The latch subassembly is further configured to engage with the second striker wire when the seat back portion is in the second position. In an alternate variation, the vehicle seat assembly further comprises a first striker wire attached to the seat bottom portion and a second striker wire attached to the seat bottom portion. The first striker wire is disposed in a position to engage with the latch subassembly when the seat back portion is in the first position. The second striker wire is disposed in a position to engage with the latch subassembly when the seat back portion is in the second position.

In a second embodiment, a vehicle seat assembly comprises a seat bottom portion that is adapted to be attached to a vehicle. The seat bottom portion has a longitudinal axis. A seat back subassembly is disposed proximate the seat bottom portion. The seat back subassembly has a back support member and a base member pivotally connected to the back support member. The vehicle seat assembly further includes a linkage connecting the base member to the seat bottom portion. The linkage is configured to move substantially the entire seat back subassembly along the longitudinal axis of the seat bottom portion between a first position and a second position.

In at least one implementation of the second embodiment, the linkage comprises a four bar linkage. In a variation of this implementation, an angular orientation between the seat back subassembly and the seat bottom portion when the seat back subassembly is in the first position is substantially the same as the angular orientation between the seat back subassembly and the seat bottom portion when the seat back subassembly is in the second position. In another variation, the base member is a first base member and the four bar linkage is a first four bar linkage. The vehicle seat assembly further comprises a second base member that is pivotally connected to the back support member and a second four bar linkage that connects the second base member to the seat bottom portion. The second four bar linkage is configured to cooperate with the first four bar linkage to move the seat back subassembly from the first position to the second position. In a variation of this implementation, the first four bar linkage is disposed proximate an outboard portion of the seat bottom portion and an outboard portion of the seat back subassembly. The second four bar linkage is disposed proximate an inboard portion of the seat bottom portion and an inboard portion of the seat back subassembly. The vehicle seat assembly further comprises a twist resilient stabilizing member connecting the first four bar linkage to the second four bar linkage. The stabilizing member is configured to facilitate generally simultaneous operation of the first four bar linkage and the second four bar linkage.

In another implementation of the second embodiment, the vehicle seat assembly further comprises a latch subassembly connected to the base member. The latch subassembly is configured to secure the seat back subassembly in the first position when the seat back subassembly is disposed in the first position and to secure the seat back subassembly in the second position when the seat back subassembly is disposed in the second position. In a variation of this implementation, the vehicle has a first striker wire and a second striker wire. The latch subassembly is configured to engage with the first striker wire when the seat back subassembly is in the first position. The latch subassembly is configured to engage with the second striker wire when the seat back subassembly is in the second position. In an alternate variation, the vehicle seat assembly further comprises a first striker wire attached to the seat bottom portion and a second striker wire attached to the seat bottom portion. The first striker wire is disposed in a position to engage with the latch subassembly when the seat back subassembly is in the first position. The second striker wire is disposed in a position to engage with the latch subassembly when the seat back subassembly is in the second position.

In a third embodiment, a vehicle seat assembly comprises a seat bottom portion that is adapted to be attached in a substantially unadjustable position in a rear portion of a passenger compartment of a vehicle. The seat bottom portion has a longitudinal axis. A seat back subassembly is disposed proximate the seat bottom portion. The seat back subassembly has a back support member, a first base member pivotally connected to the back support member, and a second base member pivotally connected to the back support member. The second base member is spaced apart from the first base support member. A first four bar linkage connects the first base member to an outboard portion of the seat bottom portion. A second four bar linkage connects the second base member to an inboard portion of the seat bottom portion. A first latch subassembly connects to the first base member. A second first latch subassembly connects to the second base member. The first and the second four bar linkages are configured to move substantially the entire seat back subassembly along the longitudinal axis of the seat bottom portion between a first position and a second position. The first and the second four bar linkages are further configured to provide an angular orientation between the seat back subassembly and the seat bottom portion when the seat back subassembly is in the first position that is substantially the same as the angular orientation between the seat back subassembly and the seat bottom portion when the seat back is in the second position. The first and the second latch assemblies are configured to secure the seat back subassembly in the first position and to secure the seat back subassembly in the second position when the seat back subassembly is disposed in the second position.

BRIEF DESCRIPTION OF THE DRAWINGS

The description herein makes reference to the accompanying drawing wherein like reference numerals refer to like parts through the several views, and in which.

DETAILED DESCRIPTION OF THE PREFERRED EMBODIMENT(S)

Detailed embodiments of the present invention are disclosed herein; however, it is to be understood that the disclosed embodiments are merely exemplary of the invention that may be embodied in various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

The invention disclosed herein relates to vehicle seat assemblies having seat back portions that are adjustable in a forward and rearward direction. In some applications, it may be desirable to increase the cargo space available behind a vehicle seat assembly without adjusting the angle of recline of the seat back portion and without moving the entire seat assembly forward. FIGS. 1 through 8 illustrate various embodiments of a vehicle seat assembly having a seat back portion that can move longitudinally both fore and aft with respect to a seat bottom portion.

Figure 1:
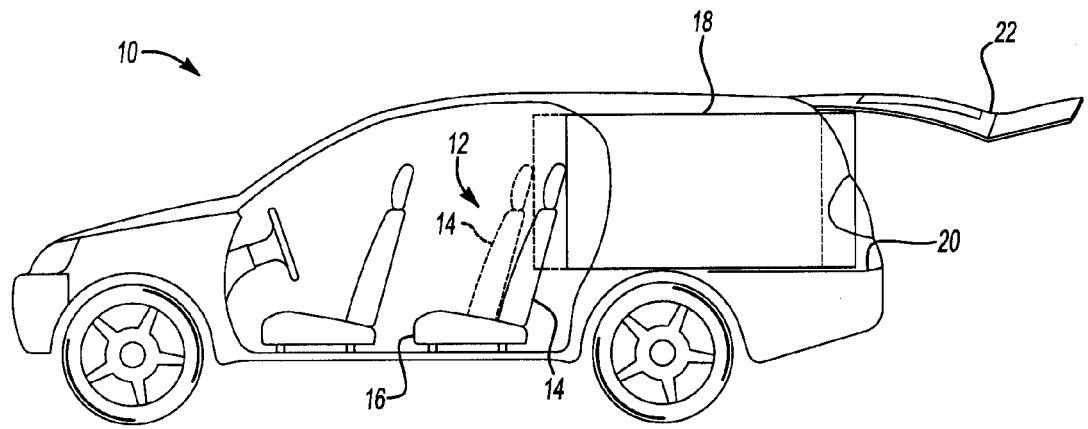
FIG. 1 is a fragmentary plan view of a vehicle equipped with an embodiment of the vehicle seat assembly of the present invention.

With respect to FIG. 1, a vehicle 10 is illustrated and is equipped with an embodiment of a vehicle seat assembly 12 of the present invention. In FIG. 1, vehicle 10 is illustrated as a hatchback. It should be understood by those of ordinary skill in the art that the teachings of the present invention are applicable to other types of vehicles including, but not limited to, sports cars, sport utility vehicles, crossover vehicles, compact utility vehicles, station wagons, sedans, minivans and pickup trucks. Further, although the vehicle seat assembly of the present invention is illustrated as being employed on an automobile, it should be understood by those of ordinary skill in the art that the teachings of the present invention are not limited to usage with automobiles, but rather, may be employed on all manner of vehicles including, but not limited to, aircraft, water craft, spacecraft, and other types of land craft including rail driven vehicles.

Vehicle seat assembly 12 includes a seat back portion 14 and a seat bottom portion 16. Substantially all of the seat back portion 14 is moveable with respect to seat bottom portion 16 in a longitudinal direction. As used herein, reference to "longitude" or the "longitudinal" direction refers to an axis that is parallel to the direction of vehicle travel. However, in applications where a seat assembly is mounted transversely to the direction of vehicle travel, then the terms "longitudinal" and "longitude" refers to an axis passing through the seat bottom from the back to the front and generally perpendicular to the seat back.

Seat back portion 14 illustrated in solid lines is in a rear or first position. Seat back portion 14 is illustrated in a forward or second position in phantom lines. Moving seat back portion 14 from the rear position to the forward position increases cargo space available behind vehicle seat assembly 12. For example, in the illustrated embodiment, a cargo item 18 is positioned in a rear portion of vehicle 10 and is resting on load floor 20. A rear portion of cargo item 18 protrudes out of the back of vehicle 10 and obstructs vehicle hatch 22 from closing. When seat back portion 14 is in the rear position, cargo item 18 is obstructed from any further forward motion by seat back portion 14. When seat back portion 14 is moved to the forward position, additional space is provided for cargo item 18 which may then be moved forward to permit vehicle hatch 22 to close.

Figure 2:
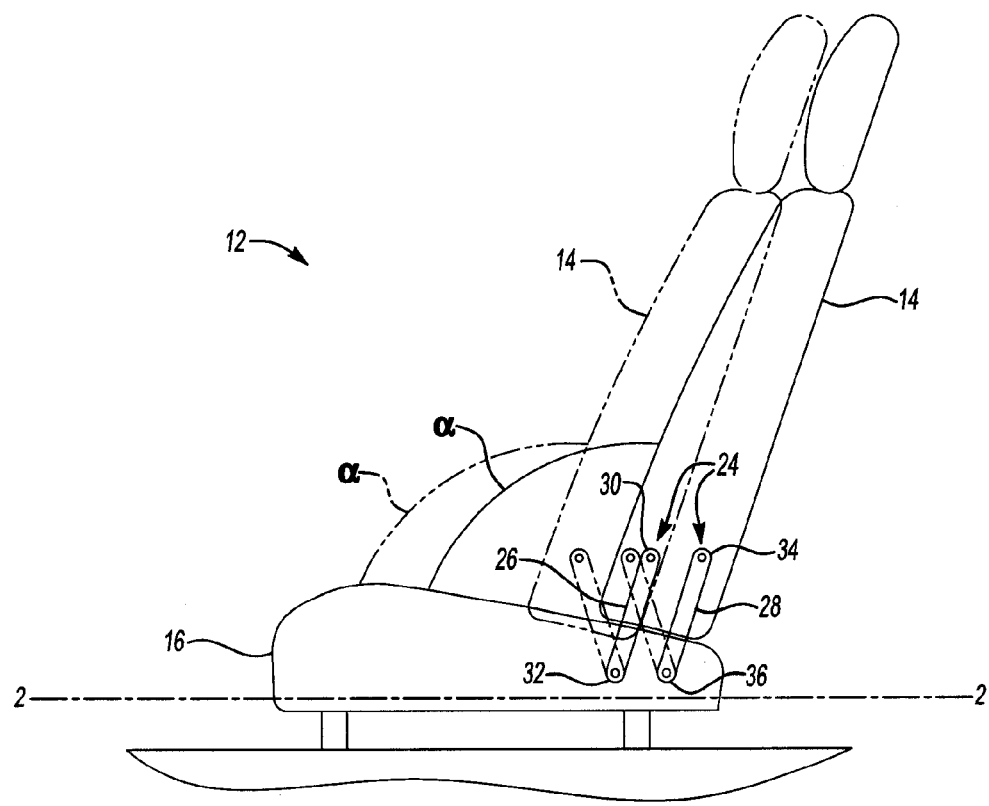
FIG. 2 is a schematic view of the vehicle seat assembly illustrated in FIG. 1.

FIG. 2 illustrates a schematic view of vehicle seat assembly 12. A longitudinal axis 2-2 is illustrated passing through seat bottom portion 16. Seat back portion 14 is connected to seat bottom portion 16 by linkage 24. In the illustrated embodiment, linkage 24 comprises a four bar linkage having a first member 26 and a second member 28. First member 26 has a first end 30 and a second end 32. Second member 28 has a first end 34 and a second end 36. First member 26 is pivotally connected at first end 30 to seat back portion 14 and is pivotally connected at second end 32 to seat bottom portion 16. Second member 28 is spaced apart from first member 26 along longitudinal axis 2-2 and is pivotally connected to seat back portion 14 at first end 34 and is pivotally connected to seat bottom portion 16 at second end 36.

Linkage 24 is a four bar linkage comprises first member 26, second member 28, seat back portion 14 and seat bottom portion 16. Seat back portion 14 is illustrated in solid lines in the rear position and is illustrated in phantom lines in the forward position. First and second members 26 and 28 pivot as seat back portion 14 moves longitudinally from the rear position to the forward position. In the illustrated embodiment, first member 26 and second member 28 are substantially the same length. Accordingly, an angular orientation of the seat back portion 14 with respect to seat bottom portion 16 is substantially the same when seat back portion 14 is in the rear position as when seat back portion 14 is in the forward position. In other embodiments, first and second members 26, 28 may have different lengths. In instances where first and second members 26, 28 have unequal lengths, the angular orientation of seat back portion 14 with respect to seat bottom portion 16 will change when seat back portion 14 moves from the rear position to the forward position.

Figure 3:
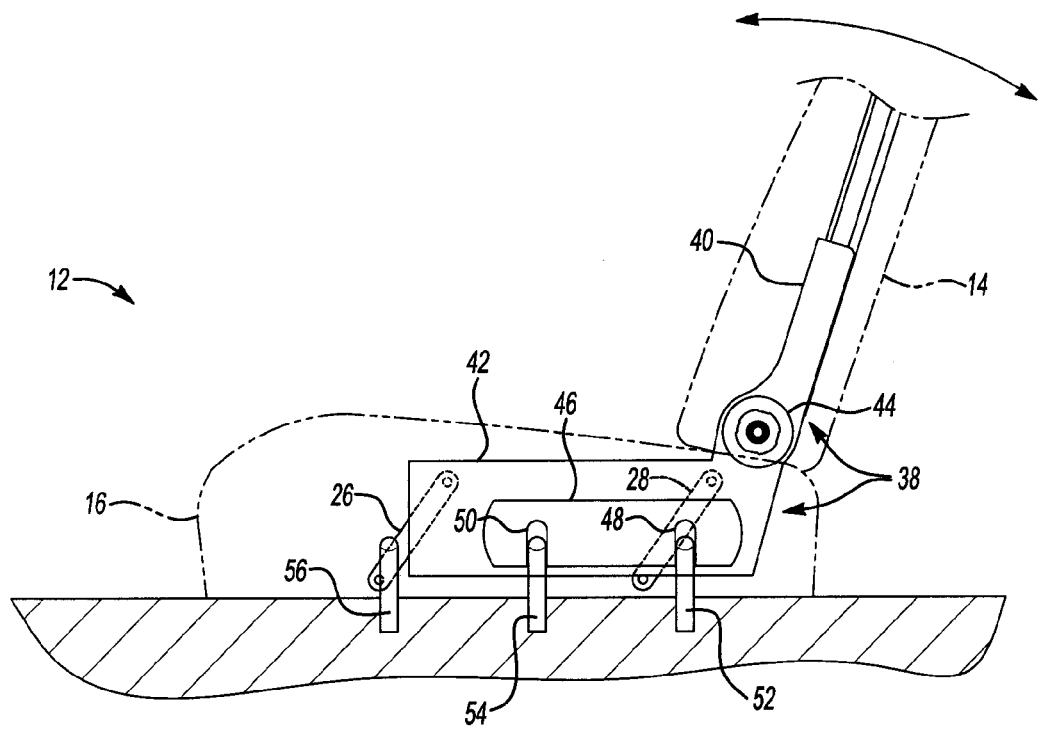
FIGS. 3-4 are fragmentary side elevational views of an embodiment of the vehicle seat assembly of the present invention illustrating the seat back in an aft configuration and a forward configuration, respectively.

FIG. 3 is a fragmentary side elevational view of an embodiment of vehicle seat assembly 12. In this embodiment, a seat back subassembly 38 is connected to seat bottom portion 16. Seat back subassembly 38 includes a back support member 40 and a first base member 42. Back support member 40 is pivotally connected to first base member 42 by pivotal connector 44 and permits back support member 40 to pivot with respect to seat bottom 16 in the longitudinal direction. First member 26 and second member 28 connect first base member 42 with seat bottom portion 16.

In the illustrated embodiment, a first latch subassembly 46 is attached to first base member 42. First latch subassembly 46 includes two latches, a first latch 48 and a second latch 50. In other embodiments, first latch subassembly 46 may have only a single latch. In still other embodiments, first latch subassembly 46 may have three or more latches. In the embodiment illustrated in FIG. 3, vehicle 10 includes a first striker wire 52, a second striker wire 54 and a third striker wire 56. The first striker wire 52 and second striker wire 54 are spaced apart longitudinally by a distance that corresponds to a distance between first latch 48 and second latch 50. Similarly, second striker wire 54 and third striker wire 56 are spaced apart longitudinally by the longitudinal distance between the first latch 48 and second latch 50. In the illustrated embodiment, first, second, and third striker wires 52, 54, and 56 are mounted to a floor of vehicle 12. First, second, and third striker wire 52, 54, and 56 are made of steel. In other embodiments, first, second, and third striker wires 52, 54, and 56 may be made of any suitable metal. First and second latches 48, 50 are configured to engage first, second, and third striker wires 52, 54, and 56. First latch subassembly 46 is positioned on support member 42 such that when seat back subassembly 38 is in the rear position, first and second latches 48, 50 engage first and second striker wires 52, 54. When engaged, first latch subassembly 46 and first and second striker wires 52, 54 cooperate to retain seat back subassembly 38 in the rear position and inhibit movement of seat back subassembly 38 to the forward position. When first latch subassembly 46 is released, first and second latches 48, 50 disengage from first and second striker wires 52, 54 and seat back subassembly 38 is then free to move to the forward position.

Figure 4:
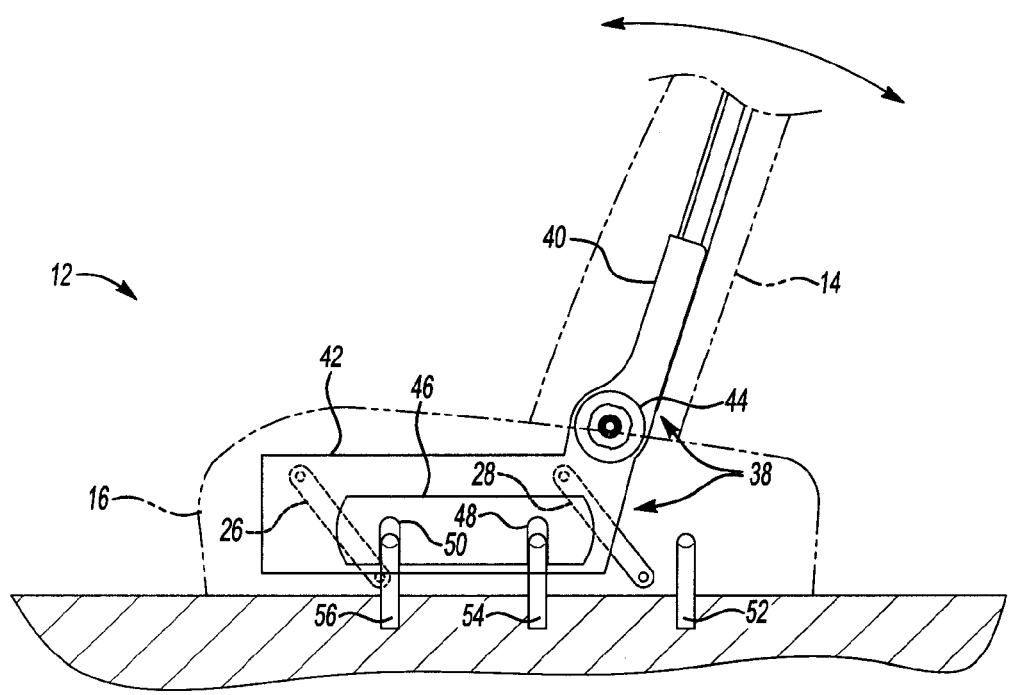

With respect to FIG. 4, seat back subassembly 38 is disposed in the forward position. When in the forward position, first latch subassembly 46 is positioned such that first and second latches 48, 50 are aligned with second and third striker wires 54, 56 and engage second and third striker wires 54, 56 to retain seat back subassembly 38 in the forward position. Seat back subassembly 38 will remain in the forward position until first latch subassembly 46 is released at which time seat back subassembly 38 may be returned to the rear position.

Figure 5:
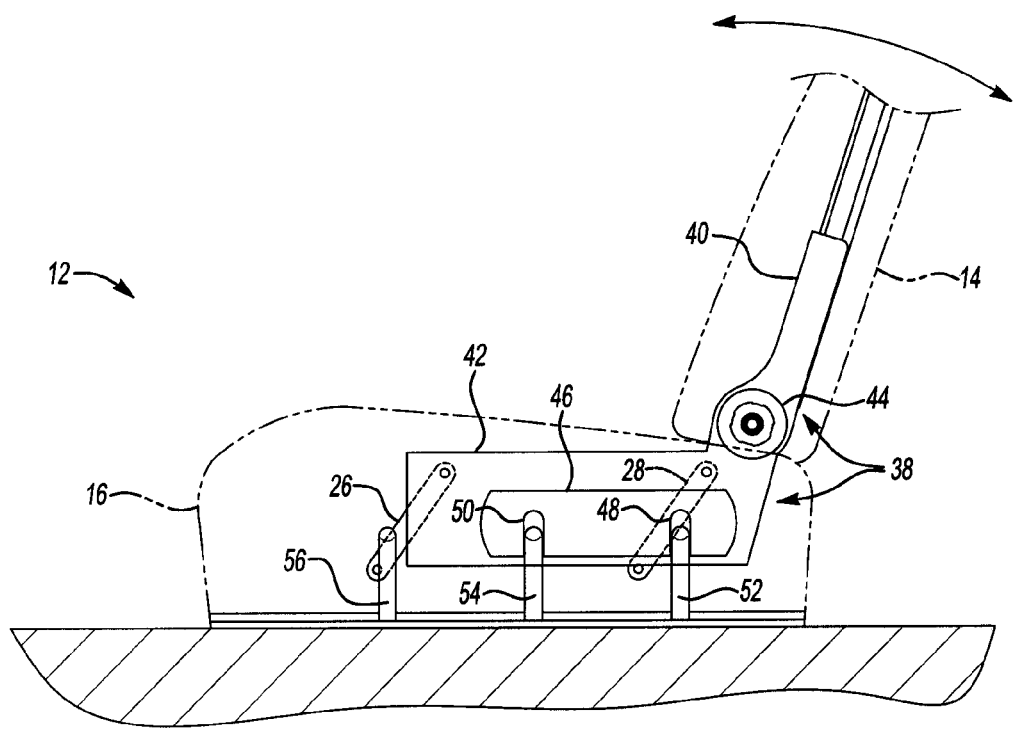
FIGS. 5-6 are fragmentary side elevational views of another embodiment of the vehicle seat assembly of the present invention illustrating the seat back in an aft configuration and a forward configuration, respectively.
Figure 6:
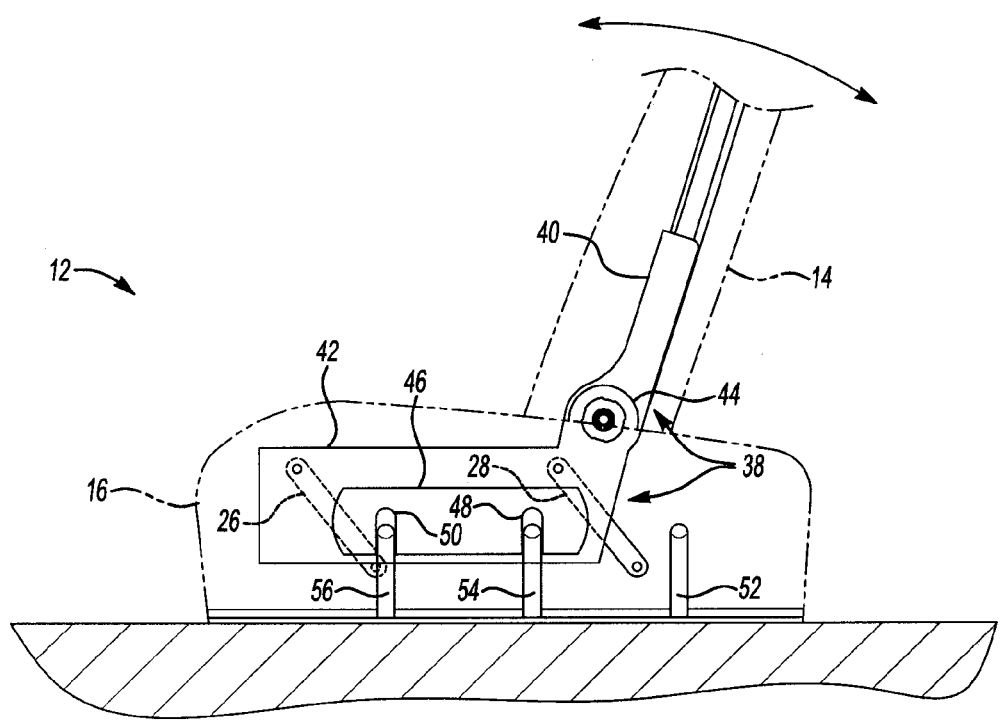

FIGS. 5 and 6 illustrate an alternate embodiment of vehicle seat assembly 12 wherein first, second, and third striker wires 52, 54, and 56 are mounted to seat bottom portion 16 rather than to a floor of vehicle 10. With first, second, and third striker wires 52, 54, and 56 mounted to seat bottom portion 16, it is possible to mount seat bottom portion 16 in a sliding relationship with the vehicle 10 and still provide the ability to move seat back subassembly 38 longitudinally between the forward and the rear position whereas the embodiment depicted in FIGS. 3 and 4 may be more suitable for implementation in a vehicle where seat bottom portion 16 remains stationary with respect to vehicle 10.

Figure 7:
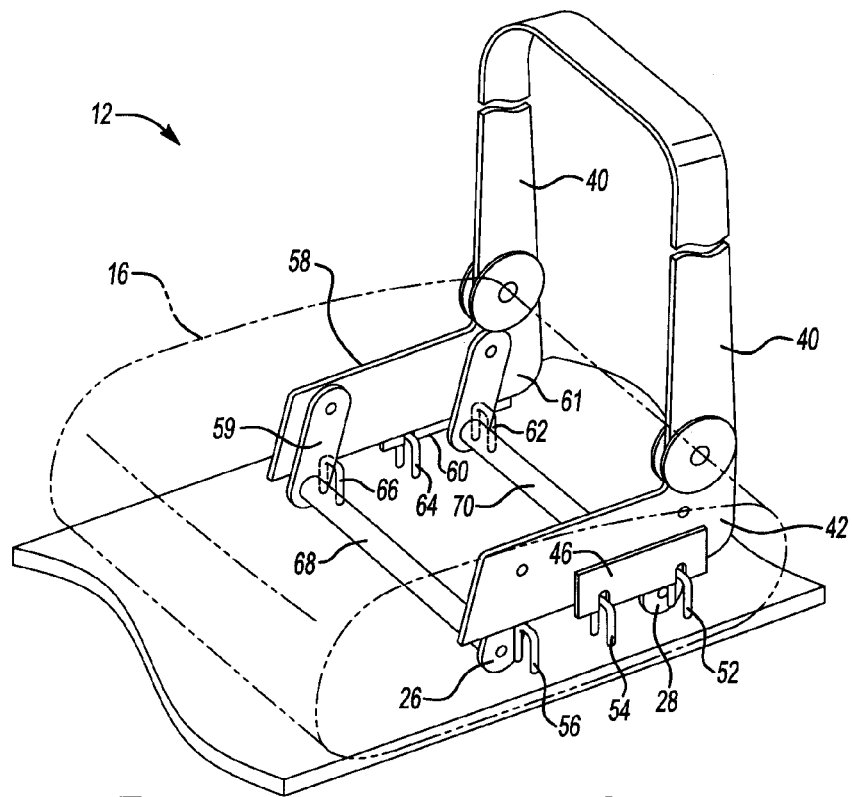
FIG. 7 is a perspective, fragmentary view of the vehicle seat assembly of FIG. 3.

FIG. 7 illustrates a perspective, fragmentary view of the embodiment of vehicle seat assembly 12 illustrated in FIG. 3. In FIG. 7, first base member 42 is disposed proximate an outboard portion of vehicle seat assembly 12. Vehicle seat assembly 12 includes a second base member 58 disposed along an inboard portion of vehicle seat assembly 12 and positioned to generally correspond with the position of first base member 42 with respect to seat bottom portion 16. In this view, it can be observed that a second latch subassembly 60 and a fourth, fifth, and sixth striker wires 62, 64, 66 are illustrated. Second latch subassembly 60 and fourth, fifth, and sixth striker wires 62, 64, and 66 cooperate with first latch subassembly 46 to retain seat back subassembly 38 in either the forward or the rearward position. A third member 59 and a fourth member 61 pivotally connected second base member 58 to seat bottom portion 16, thus defining a second four bar linkage for controlling the motion of seat back subassembly 38 between the rear position and the forward position.

A first stabilizing member 68 joins first member 26 with third member 59. A second stabilizing member 70 joins second member 28 with fourth member 61. In the illustrated embodiment, first and second stabilizing members 68, 70 are steel cylindrical tubes that are welded to their respective members. Accordingly, first stabilizing member 68 facilitates simultaneous rotation of first member 26 with third member 59 because the pivoting of one of the members will, by virtue of its fixed relationship with first stabilizing member 68, cause the pivoting of the other member. The same is true of the relationship between second stabilizing member 70, second member 28 and fourth member 61. The presence of first and second stabilizing members thus facilitates the simultaneous movement of first base member 42 with second base member 58 as seat back subassembly 38 moves between the rear and forward positions. In other embodiments, first and second stabilizing members 68, 70 may be affixed to their respective members by any means including, but not limited to, the use of threaded fasteners, braizing, and any other method effective to maintain a rigid connection.

Figure 8:
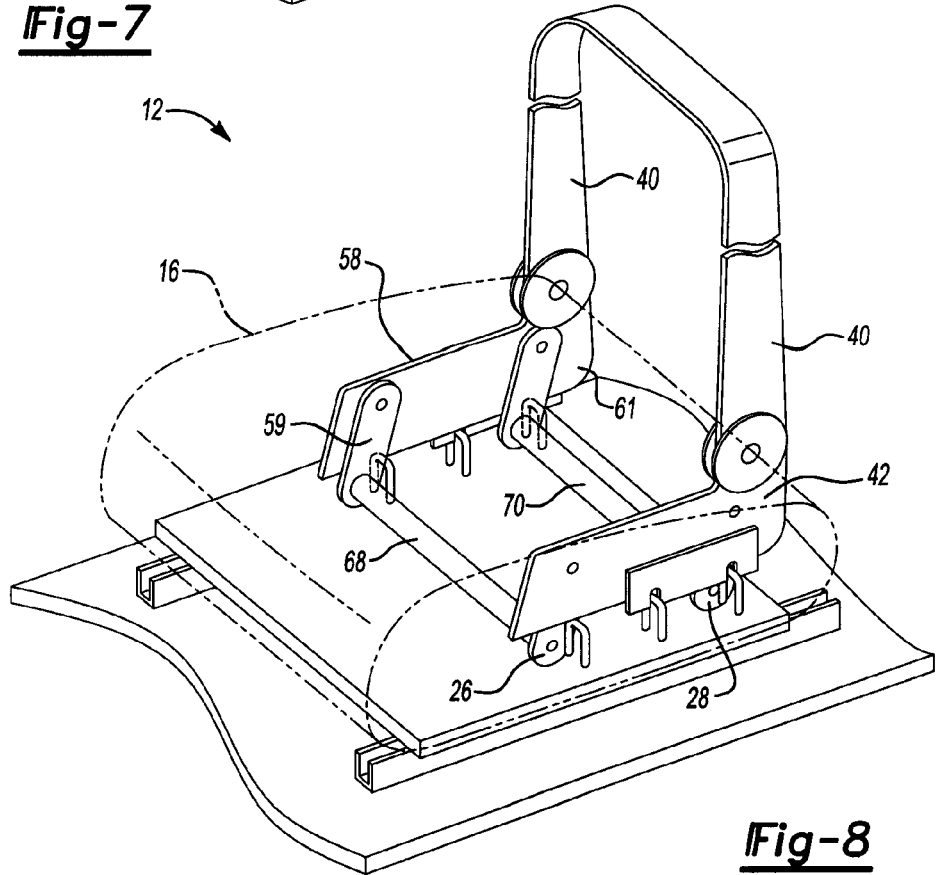
FIG. 8 is a perspective fragmentary view of the embodiment of the vehicle seat assembly of FIG. 5.

In FIG. 7, the first, second, and third striker wires 52, 54, and 56 and fourth, fifth, and sixth striker wires 62, 64, and 66 are mounted to the floor of vehicle 10. FIG. 8 is a perspective fragmentary view of the vehicle seat assembly 12 illustrated in FIG. 5. In the embodiment illustrated in FIG. 8, first, second, and third striker wires 52, 54, and 56 and fourth, fifth, and sixth striker wires 62, 64, and 66 are mounted to seat bottom portion 16 and thus permits seat bottom portion 16 to be slidably mounted to vehicle 10.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly comprising:
   a track assembly;
   a seat bottom portion disposed on the track assembly and configured to move along a longitudinal axis;
   a seat back portion disposed proximate the seat bottom portion;
   a first base member moveably disposed on seat bottom portion;
   a latch moveably disposed on the first base member, the latch having a first slot;
   first and second strikers disposed substantially parallel to each other and fixedly disposed on the seat bottom portion that extends away from the track assembly and toward a top of the seat bottom portion; and
   a first linkage connecting the first base member to the seat bottom portion;
   wherein the first linkage is configured to move the seat back portion in a direction extending along the longitudinal axis between a first position and a second position when the first and second strikers are not disposed in the first slot; and
   wherein the latch engages the first and second strikers when the seat back portion is in the first position and engages the second striker but not the first striker when the seat back portion is in the second position.

2. The seat assembly of claim 1 wherein an angular orientation between the seat back portion and the seat bottom portion when the seat back portion is in the first position is substantially the same as the angular orientation between the seat back portion and the seat bottom portion when the seat back portion is in the second position.

3. The seat assembly of claim 1 wherein the first linkage comprises a four bar linkage.

4. The seat assembly of claim 3 wherein the four bar linkage comprises a first member having a first end and a second end, a second member having a first end and a second end, the first member and the second member being pivotally connected at their respective first ends to the seat back portion, the first member and the second member being pivotally connected at their respective second ends to the seat bottom portion.

5. The seat assembly of claim 1 further comprising a second linkage connecting the seat back portion to the seat bottom portion, the second linkage being configured to cooperate with the first linkage to move the seat back portion from the first position to the second position.

6. The seat assembly of claim 5 wherein the first linkage is disposed proximate an outboard portion of the seat bottom portion and an outboard portion of the seat back portion, and the second linkage is disposed proximate an inboard portion of the seat bottom portion and an inboard portion of the seat back portion.

7. The seat assembly of claim 6 further comprising a stabilizing member connecting the first linkage to the second linkage, the stabilizing member being configured to facilitate generally simultaneous operation of the first and the second linkage.

8. The seat assembly of claim 1 wherein an angular orientation of the seat bottom portion does not change when the seat back portion moves between the first and second positions.

9. A seat assembly comprising:
   a track assembly;
   a seat bottom portion disposed on the track assembly and configured to move along a longitudinal axis;
   a seat back portion disposed proximate the seat bottom portion;
   a first base member moveably disposed on seat bottom portion;
   a latch moveably disposed on the first base member, the latch having a first slot;
   a striker fixedly disposed on the seat bottom portion that extends away from the track assembly and toward a top of the seat bottom portion; and
   a linkage connecting the first base member to the seat bottom portion;
   wherein the linkage is configured to move the seat back portion in a direction extending along the longitudinal axis between a first position and a second position when the striker is not disposed in the first slot; and
   wherein the latch moves linearly away from the track assembly to disengage the striker.

10. The seat assembly of claim 9 wherein the linkage comprises a four bar linkage.

11. The seat assembly of claim 9 wherein an angular orientation of the seat back portion with respect to the seat bottom portion remains the same when the seat back portion is in the first and second positions.

12. The seat assembly of claim 9 wherein the latch includes a second slot disposed parallel to the first slot.

13. The seat assembly of claim 9 further comprising first and second strikers disposed substantially parallel to each other.

14. The seat assembly of claim 13 wherein the latch engages the first and second strikers when the seat back portion is in the first position and engages the second striker but not the first striker when the seat back portion is in the second position.

15. The seat assembly of claim 14 further comprising a third striker, wherein the latch engages the second and third strikers when the seat back portion is in the second position.

* * * * *